United States Patent [19]
Kitagishi et al.

[11] Patent Number: 4,907,866
[45] Date of Patent: Mar. 13, 1990

[54] OBJECTIVE OF VARIABLE FOCAL LENGTH

[75] Inventors: Nozomu Kitagishi, Tokyo; Hiroki Nakayama, Kanagawa; Shigeyuki Suda, Tokyo; Jun Hattori, Kanagawa; Akihisa Horiuchi, Tokyo, all of Japan

[73] Assignee: Canon Kabushiki Kaisha, Tokyo, Japan

[21] Appl. No.: 847,236

[22] Filed: Apr. 2, 1986

[30] Foreign Application Priority Data

Apr. 5, 1985 [JP] Japan ................................. 60-072031
Apr. 25, 1985 [JP] Japan ................................. 60-089193
Apr. 26, 1985 [JP] Japan ................................. 60-090127

[51] Int. Cl.$^4$ .......................................... G02B 15/177
[52] U.S. Cl. .................................... 350/426; 350/413
[58] Field of Search ...................... 350/426, 413, 96.31

[56] References Cited

U.S. PATENT DOCUMENTS 3,486,808 12/1969 Hamblen .
3,626,194 12/1971 Hirano .
4,367,927 1/1983 Fujii ..................................... 350/426
4,457,590 7/1984 Moore ................................. 350/413
4,571,032 2/1986 Someya et al. ................... 350/96.31
4,647,159 3/1987 Baba .
4,659,186 4/1987 Sato et al. .
4,674,843 6/1987 Baba et al. .
4,696,552 9/1987 Hattori et al. .
4,721,369 1/1988 Hattori et al. .

FOREIGN PATENT DOCUMENTS 3541583 7/1986 Fed. Rep. of Germany .

OTHER PUBLICATIONS

Atkinson, III et al., "Gradient-Index Wide-Angle Photographic Objective Design", Applied Optics, vol. 23, No. 11, Jun. 1984, pp. 1735-1741.
Atkinson, III et al., "Design of a Gradient-Index Photographic Objective", Applied Optics, vol. 21, No. 6, Mar. 15, 1982, pp. 993-998.
Meyer-Arendt, Jurgen R., "Gradient-Index Lenses", Introduction to Classical and Modern Optics, 1984, pp. 362-365.
Camera International (No. 4, Apr. 1965, pp. 36, 37.

Primary Examiner—Bruce Y. Arnold
Assistant Examiner—Terry S. Callaghan
Attorney, Agent, or Firm—Fitzpatrick, Cella, Harper & Scinto

[57] ABSTRACT

An objective of variable focal length includes a plurality of lens units of which the first, counting from front, is of negative power and the second is of positive power. At least the first and second lens units are moved with variation of the air separation therebetween to vary the focal length of the entire system. The objective is characterized in that at least one of the lens units is included with at least one refractive index distribution type lens arranged on the common optical axis of the other lenses.

18 Claims, 12 Drawing Sheets

OBJECTIVE OF VARIABLE FOCAL LENGTH

BACKGROUND OF THE INVENTION

1. Field of the Invention:

This invention relates to objectives of variable focal length, and more particularly to such an objective comprising a plurality of lens units of which the first and second counting from the front, i.e. objective side, are of negative and positive powers respectively, and are moved with variation of the amount of air separation therebetween to vary the focal length of the complete objective.

2. Description of the Prior Art:

In the objectives of variable focal length, besides the achievement of good correction of aberrations at a standard setting, it is generally required that the good correction of aberrations be maintained as stable as possible throughout entire range of variation of the focal length. To this end, all the movable lens units must be individually well corrected for spherical aberration, coma and astigmatism. So, each of such lens units is usually constructed with several lens elements.

Recently there have been an increasing demand for reducing the bulk and size of the varifocal objective and extending the range of the focal length. With respect to the former, in the type of varifocal objective comprising two or more lens units of which the first and second counting from the front are respectively negative and positive in the refractive power. The lens units are moved axially in differential relation to each other to vary the focal length of the complete objectives, so far as the paraxial region is concerned, either the power of each lens unit may be strengthened, or the interval between the principal points of the successive two of the lens units may be shortened. With respect to extending the range of variation of the focal length, so far as the paraxial region is concerned, either the power of each lens unit may be strengthened, or the total movement of the zoom lens unit may be elongated. For the paraxial region alone, a common means for achieving both a reduction in the size and an increase in the zoom ratio is found to strengthen the power of each zoom lens unit. For the intermediate and marginal zones, good stability of aberration correction is realized when the number of constituent lenses in each unit is increased in order to strengthen the power of the unit. Another method of strengthening the power of each unit is to increase the surface curvatures of each constituent lens. For this purpose, the minimum acceptable center thickness of the convex lens, or the minimum acceptable air separation of the concave lens surface must be increased. In either case, the overall thickness of each lens unit has to be increased, with the result that it becomes difficult to achieve a much-desired reduction of the physical length of the complete objective. Also, for a given value of the physical length, the longer the overall thickness of each lens unit, the shorter the total movement of the zoom lens unit. A much-desired increase in the zoom ratio becomes difficult to achieve.

In this connection, it should be pointed out that in the above-identified zoom lens unit, positive second lens unit often has the strongest power among all the lens units, thus contributing to a large proportion of the zoom ratio. If a reduction in size is attempted by further strengthening the power of the second lens unit, the necessary number of its constituent lenses increases. Concomitantly, its over all thickness tends to increase objectionably.

The thickness of last lens unit which increases due to the increase in the number of lenses also gives rise to a problem, i.e. if a flippable mirror or a beam splitter is positioned in a space between the rear vertex of the last lens unit and an image plane, a sufficiently large space cannot often be created. Such a vicious circle has placed a limitation on the reduction of the size and the increase of the range of variation of the focal length insofar as any usual homogenous medium lens system is adopted.

As a specific example, suppose a two-unit objective of variable focal length whose negative first and positive second units are moved with decreasing air separations therebetween as when zooming from the wide angle to the telephoto side is designed with an aim to reduce the total length of the entire system from the front vertex to the image plane. Such a design may be achieved by relying on the method of strengthening the power of the second lens unit in combination with shortening of the interval between the principal points of the first and second units. Then, increase of the power of the positive second unit calls for an increase in the necessary number of its constituent lenses to properly correct all aberrations therein itself. This involves an increase of the overall thickness of the second lens unit. Therefore, the principal point interval has to be increased. For this reason, this militates against a decrease in the total length of the entire system.

Such an increase of the overall thickness of the second lens unit has produced another problem. Since it is the last lens unit, for, as a flippable mirror or a prism occupies a space between the rear vertex of the second or last lens unit and the image plane, a somewhat long lens back is required. It is impossible to keep it at the minimum acceptable value.

Meanwhile, using the method of strengthening the power of each lens unit in shortening the total length of the complete objective of variable focal length makes correction of the Petzval sum difficult.

Taking an example of the two-unit objective whose first and second lens units counting from the front are negative and positive in power respectively. The focal length f of the entire system can be expressed by $f = f_1 \times \beta_2$ where $f_1$ is the focal length of the negative first lens unit, and $\beta_2$ is the image magnification. Therefore, even for the same value of image magnification, whichever focal length of the positive second lens unit is shorter, the total length of the entire system can be shortened even more. To use this rule without sacrificing the preservation of the total zooming movements of the positive first and negative second lens units, the second lens unit has to be constructed in the telephoto form with such a power distribution that the principal point is brought farther ahead by increasing the tendency to the second lens unit to be of the telephoto type. So, an attempt to shorten the total length by this method results in a large negative value of the Petzval sum. This implies that the curvature of field is over-corrected.

Further, if the Petzval sum is corrected by lowering the refractive index of the convex lens, or by combining positive and negative lenses of strong power, the spherical aberration is increased very much and very large higher order aberrations are produced. Thus it becomes impossible to achieve good stability of aberration correction throughout the entire range of variation of the focal length. It should be recognized that the reduction of the bulk and size of the objective of variable focal length and the good correction of the Petzval sum are contradictorily related to each other.

SUMMARY OF THE INVENTION

An object of the present invention is to eliminate the above-described drawbacks of the prior art, and to provide an objective of variable focal length which enables its bulk and size to be reduced with an increase in the range of variation of the focal length, while still permitting good stability of aberration correction to be achieved throughout the extended range of variation of the focal length.

Another object is to provide an objective of variable focal length which is amenable to easy assembling and adjusting techniques.

To achieve these objects, according to the present invention applied to the objective of variable focal length comprising a plurality of lens units of which the first counting from front, i.e. objective side, is of negative power and the second is of positive power, the first and second lens units being moved with varying air separations therebetween to vary the focal length of the entire system, at least one of the lens units is included with at least one refractive index distribution type lens.

The above-stated refractive index distribution type lens has a refractive index pattern along either the radius or the optical axis thereof (hereinafter referred to as "radial" or "axial" type, respectively). Both patterns of the radial and axial types can also take place in a single lens. Further, the radial type pattern has two directional aspects, one of which is to decrease the refractive index as the height from the optical axis increases, (hereinafter referred to as "positive gradient" power), and the other of which is to increase as the height increases (hereinafter referred to as "negative gradient" power).

As has been described above, the objective constituting the present invention has a feature that at least the second lens unit is made up by using at least one refractive index distribution type lens. Accordingly, it is possible possible to properly correct aberrations without involving any increase in the number of constituent lenses. Thus, a great reduction of the bulk and size and weight can be achieved. Further improved results can be attained when one or more of the lens units other than the second one is designed with the use of one or more of the refractive index distribution type lens. Again, the refractive index distribution type lens can take any form. So, when its surface curvature, focal length and refractive index gradient are controlled, the lens can embody a wide variety of capabilities. By selecting one or more of the lens units for employing such a lens and by arranging it in a desired position, a wide variety of forms of the lens system can be obtained.

BRIEF DESCRIPTION OF THE DRAWINGS

Odd-numbered

Even-numbered FIGS. 2 to 12 are graphic representations constituting the aberrations of the lenses of the present odd-numbered FIGS. 1 to 11 in three different focal length positions.

DETAILED DESCRIPTION OF THE PREFERRED EMBODIMENTS

Figure 1:
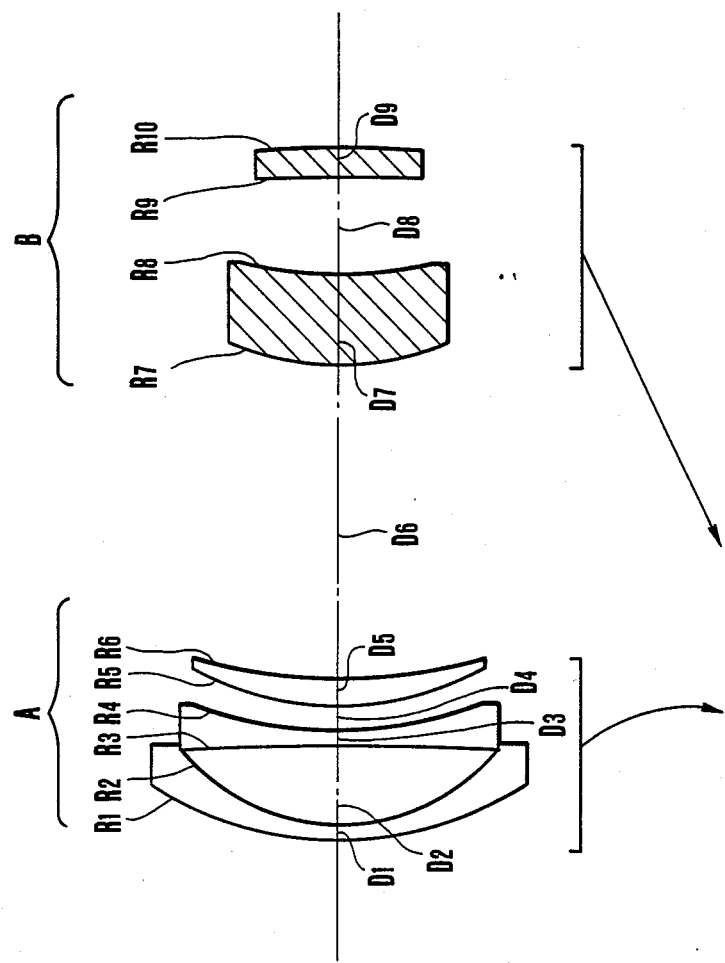
FIGS. 1 to 11 are longitudinal section views of Examples 1 to 6 of specific objectives of the invention.
Figure 2:
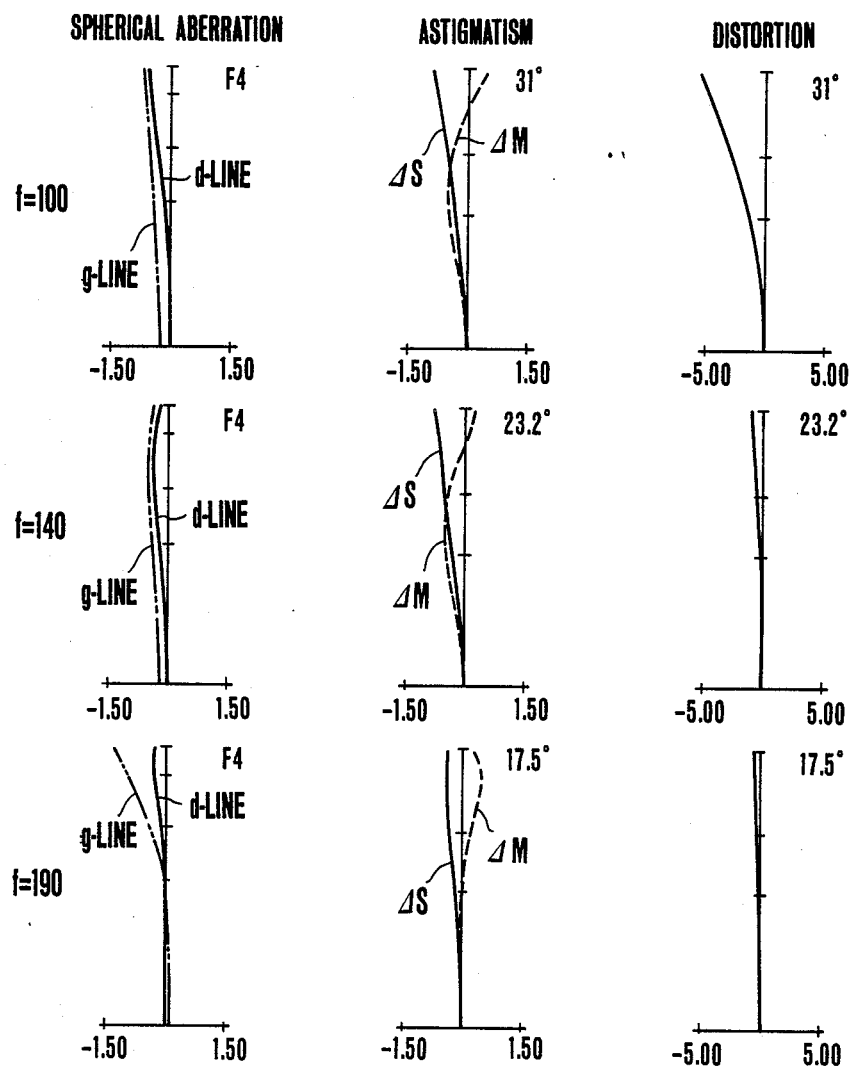

FIGS. 1 and 2 illustrates an example of a specific objective constituting the present invention. In FIG. 1, $Ri(i=1, 2, 3, ...)$ represents the i-th surface counting from front, $Di(i=1, 2, 3, ...)$ represents the axial thickness or air separation between the i-th and (i+1)th surfaces counting from front, and A and B represent the first and second lens units respectively, whose motions during zooming are roughly depicted by respective arrow-headed curves.

The aberration curves represent the spherical aberration, astigmatism and distortion when the focal length is $f=100$ mm, 138.9 mm, or 188.4 mm. The spherical aberration for spectral g-line or d-line is labelled g or d respectively, and S and M indicate the astigmatisms in the sagittal and meridional planes respectively.

The numerical data in accordance with which the objective of FIG. 1 can be constructed are listed in the following Tables 1-1 and 1-2, and the values of the coefficients of the terms of a refractive index distribution function for the used refractive index distribution type lens are listed in the following Table 1-3. In Table 1-1, f is the focal length, FNO is the F-number, 2 w is the total image angle, $Ri(i=1, 2, 3, ...)$ is the radius of curvature of the i-th surface counting from front with the convex curvature toward the front being taken as positive, and the concave curvature as negative. Also, $Di(i=1, 2, 3, ...)$ is the axial thickness or air separation between the i-th and (i+1)th surfaces counting from front. Ni and $Vi(i=1, 2, 3, ...)$ are refractive index and Abbe number of the i-th lens counting from front respectively. Further, a refractive index distribution function for the radial type lens at the i-th place counting from front in terms of the height h from the optical axis can be expressed by the following formula:

$$Ni(h) = N_0 + N_1 h^2 + N_2 h^4 + N_3 h^6 + N_4 h^8 + N_5 h^{10} + ... \quad (1)$$

where $N_O$ represents the value of refractive index on the axis, and $N_1, N_2, N_3 ...$ are the coefficients. The values for the g-line and d-line of the $N_O$ and the coefficients are listed in Table 1-3. Table 1-2 shows the axial air separations between the lens units A and B during varying the focal length.

The objective of FIG. 1 has features which are described in detail below. This objective is constructed with, from front to rear, a negative first lens unit A and positive second lens unit B. As the focal length varies from the shortest or wide angle to the longest or telephoto side, the lens units A and B are moved axially while their air separation is shortened. The second lens unit B is constructed with, from front to rear, a positive radial gradient type lens defined by surfaces R7 and R8, and a negative radial gradient type lens defined by surfaces R9 and R10.

As the front lens R7, R8 in the positive second lens unit B has such a refractive index pattern that the refractive index becomes progressively lower as the distance in a perpendicular direction to the optical axis increases from the optical axis to the margin, the refractive index distribution coefficients $N_1$ and $N_2$ have negative values, or $N_1<0$, $N_2<0$. Such a refractive index distribution is used for correcting the spherical aberration of the positive lens R7, R8, since this lens, if of a homogeneous medium, would produce large residual spherical aberration. That is, when the conditions or features $N_1<0$ and $N_2<0$ are satisfied, the refractive index pattern on the front or convex surface R7 of that positive lens can be made progressively lower from the optical axis to the marginal zone. Consequently that the spherical aberration which would otherwise be under-corrected as usual can be corrected toward the opposite direction. Because $N_2<0$, the third-order spherical aberration due to the positive gradient of refractive index in the medium of the lens is increased in a direction to be under-corrected. When this aberration is balanced with the aforesaid one of the front surface, good correction of spherical aberration and coma can be achieved.

Another advantage arising from $N_1<0$ is that because the medium of the lens gets a positive power $\phi(=-2N_1D)$, it shares the required power for the positive lens with its surface curvatures R7 and R8. This permits these curvatures to be weakened with a reduction of aberrations. Further, because the power of the positive or front lens can be strengthened, it is possible to increase the tendency of the second lens unit to be of the telephoto type.

With respect to the rear lens R9, R10 in the second lens unit B though of the convex form, because of its refractive index pattern, its refractive index becomes progressively higher with an increase in the height from the optical axis, and gets a negative power. When features $N_1<0$ and $N_2>0$ are satisfied, distortion in the wide angle side, and astigmatism in the wide angle and telephoto sides are well corrected. Further, the feature or $N_1>0$ implies that the negative power of the rear part of the second lens unit B is strengthened. This contributes to an increase in the tendency to the telephoto type. Another advantage is that as rays of light pass through the interior of the rear lens, over-corrected spherical aberration is produced particularly on the telephoto side, cancelling the residual under-corrected spherical aberration of the front lens R7, R8.

The use of such refractive index distribution type lenses in the objective of the invention produce additional advantages which are explained below.

Compared with the conventional second lens unit which usually requires five or more lenses provided that the conventional objective is of the same type as that of the objective of the invention, the positive second lens unit of the invention is constructed with only two lenses. Therefore, a great reduction of the weight and size has been achieved. Also, because the necessary number of lenses is greatly reduced, despite the fact that it is customary to assign very severe tolerances of the air separations and decentering to the second lens unit, the assembling and adjusting operations are facilitated. Also, the second lens unit B is used for correcting spherical aberrations in the telephoto positions, distortion in the wide angle positions, and astigmatism over the entire range of focal length.

The front and rear parts of the positive second lens unit B are both provided with the positive and negative gradient powers in the media thereof respectively. Consequently, the positive power of the front part of the positive second lens unit B and the negative power of the rear part can both be strengthened. Therefore, the tendency to the telephoto nature of the positive second lens unit B can be strengthened to bring the principal point farther ahead. Because the interval between the principal points of the negative first lens unit A and the positive second lens unit B can be shortened, and further the focal length of the positive second lens unit can be decreased, it made possible to achieve a great reduction of the total length of the entire system. Also, because the number of constituent lenses is so much reduced that the overall thickness of the second lens unit B can be held to a minimum, a sufficiently large lens back on the wide angle side can be preserved.

While the use of the method of strengthening the negative power of the rear part of the positive second lens unit to reduce the size of such an objective of variable focal length, as in the present invention, usually results in extreme over-correction of curvature of field, it is possible to avoid the fall of the curvature of field to over-correction by using the refractive index distribution type lens.

TABLE 1-1

| | f = 100-190 mm FNO = 4 2ω = 62°-35.1° | | |
|---|---|---|---|
| Radius of Curvature | Axial Thickness or Air Separation | Refractive Index | Abbe Number |
| R1 = 88.072 | D1 = 5.28 | N1 = 1.65844 | ν1 = 50.9 |
| R2 = 54.302 | D2 = 25.83 | | |
| R3 = −640.871 | D3 = 4.72 | N2 = 1.65844 | ν2 = 50.9 |
| R4 = 124.363 | D4 = 7.46 | | |
| R5 = 87.335 | D5 = 8.56 | N3 = 1.72825 | ν3 = 28.5 |
| R6 = 181.835 | D6 = variable | | |
| R7 = 81.535 | D7 = 27.15 | N4 = N4 (h) | |
| R8 = 150.326 | D8 = 28.76 | | |
| R9 = −2292.783 | D9 = 9.29 | N5 = N5 (h) | |
| R10 = −275.983 | | | |

TABLE 1-2

| | f | | |
|---|---|---|---|
| Di | 100 | 140 | 190 |
| D6 | 95.8284 | 45.6001 | 12.5552 |

TABLE 1-3

| Ni ( ) | λ | N0 | N1 | N2 | N3 |
|---|---|---|---|---|---|
| N4 (h) | d | 1.60311 | $-1.08471 \times 10^{-4}$ | $-1.92180 \times 10^{-8}$ | $-5.90890 \times 10^{-12}$ |
| | g | 1.61539 | $-1.07847 \times 10^{-4}$ | $-1.89218 \times 10^{-8}$ | $-5.81400 \times 10^{-12}$ |
| N5 (h) | d | 1.59270 | $1.29581 \times 10^{-4}$ | $1.05090 \times 10^{-7}$ | $6.49298 \times 10^{-11}$ |
| | g | 1.61455 | $1.37053 \times 10^{-4}$ | $1.07045 \times 10^{-7}$ | $6.54842 \times 10^{-11}$ |

Figure 3:
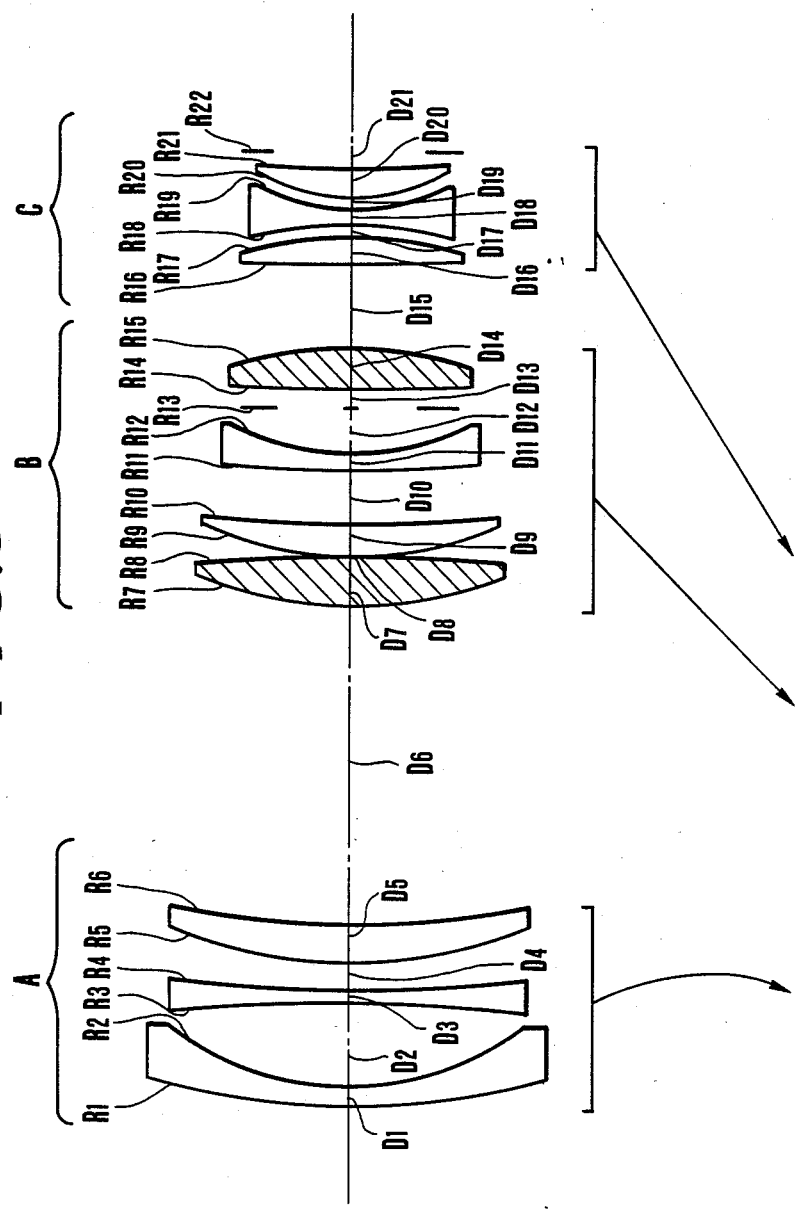
Figure 4:
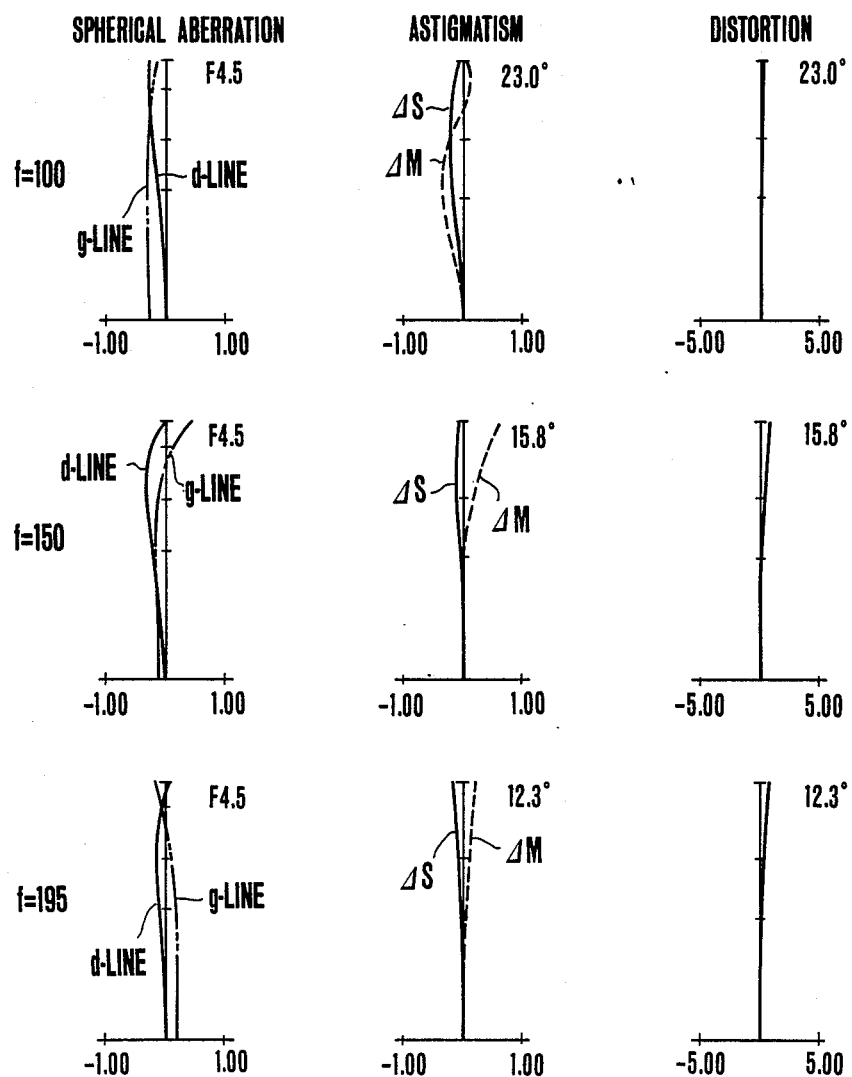

FIG. 3 illustrates another example of the objective of variable focal length according to the invention whose aberrations in the focal length positions of f=100 mm, 150 mm and 195 mm are shown in FIG. 4. This objective can be constructed in accordance with the numerical data given in Tables 2-1 to 2-3 where an equation for the refractive index distribution Ni(x) of the i-th lens which is of the axial type in terms of the axial distance, x, measured from the front vertex can be expressed by the following formula:

$$Ni(x) = N_0 + N_1 x + N_2 x^2 + N_3 x^3 + N_4 x^4 + \ldots \quad (2)$$

where $N_0$ is the refractive index at the front vertex, and $N_1, N_2, N_3, \ldots$ are refractive index distribution coefficients.

The objective of FIG. 3 comprises, from front to rear, a negative first lens unit A, a positive second lens unit B and positive third lens unit C. All three units being axially moved with the air separations between the units A and B and between the units B and C both being decreased as the focal length of the entire system is increased from the wide angle to the telephoto side.

The positive second lens unit B is included with a frontmost lens defined by surfaces R7 and R8 and a rearmost lens defined by surfaces R14 and R15. Both lenses are of the axial type and have such a pattern that the refractive index becomes progressively lower as the distance from the front to rear increases.

The frontmost lens R7, R8 has a positive power, and, because of its lowering refractive indices from the front surface to the rear surface, affects that spherical aberration which would otherwise usually result in large under-correction from the front surface of the unit B tends toward over-correction. Also, the astigmatism which would otherwise result in under-correction when in the wide angle and telephoto positions tends toward over-correction.

The rearmost lens R14. R15 has a positive power. Because of its lowering refractive indices from the front to the rear surface, it is able to correct the higher order spherical aberrations which have been too over-corrected by the positive frontmost lens R7, R8.

TABLE 2-1

$f = 100-195.0$ mm FNO = 4.5 $2\omega = 46°-24.6°$

| Radius of Curvature | Axial Thickness or Air Separation | Refractive Index | Abbe Number |
|---|---|---|---|
| R1 = 131.851 | D1 = 4.31 | N1 = 1.83400 | $\nu 1$ = 37.2 |
| R2 = 53.473 | D2 = 15.72 | | |
| R3 = −346.320 | D3 = 2.94 | N2 = 1.62280 | $\nu 2$ = 57.0 |
| R4 = 352.665 | D4 = 4.55 | | |
| R5 = 83.175 | D5 = 6.86 | N3 = 1.80518 | $\nu 3$ = 25.4 |
| R6 = 181.040 | D6 = variable | | |
| R7 = 72.542 | D7 = 9.39 | N4 = N4 (x) | |
| R8 = −356.984 | D8 = 0.20 | | |
| R9 = 76.167 | D9 = 5.88 | N5 = 1.49831 | $\nu 5$ = 65.0 |
| R10 = 273.898 | D10 = 9.71 | | |
| R11 = 190.622 | D11 = 3.73 | N6 = 1.84666 | $\nu 6$ = 23.9 |
| R12 = 46.571 | D12 = 8.24 | | |
| R13 = diaphragm | D13 = 3.53 | | |
| R14 = 417.367 | D14 = 7.84 | N7 = N7 (x) | |
| R15 = −81.444 | D15 = variable | | |
| R16 = −3493.888 | D16 = 4.71 | N8 = 1.60562 | $\nu 8$ = 43.7 |
| R17 = −73.601 | D17 = 2.53 | | |
| R18 = −80.767 | D18 = 2.75 | N9 = 1.62041 | $\nu 9$ = 60.3 |
| R19 = 36.911 | D19 = 2.33 | | |
| R20 = 42.473 | D20 = 4.71 | N10 = 1.67000 | $\nu 10$ = 57.4 |
| R21 = 148.808 | D21 = variable | | |
| R22 = movable stopper | | | |

TABLE 2-2

| Di | f | | |
|---|---|---|---|
| | 100 | 150 | 195 |
| D6 | 61.515 | 21.617 | 2.328 |
| D15 | 15.097 | 8.218 | 4.888 |
| D21 | 3.628 | 18.827 | 31.373 |

TABLE 2-3

| Ni ( ) | $\lambda$ | $N_0$ | $N_1$ | $N_2$ |
|---|---|---|---|---|
| N4 (x) | d | 1.75500 | $-2.18362 \times 10^{-2}$ | $-5.31731 \times 10^{-15}$ |
| | g | 1.77296 | $-2.27914 \times 10^{-2}$ | $-3.44476 \times 10^{-5}$ |
| N7 (x) | d | 1.67000 | $-1.05404 \times 10^{-2}$ | $-3.12351 \times 10^{-5}$ |
| | g | 1.68449 | $-1.09583 \times 10^{-2}$ | $-1.36816 \times 10^{-5}$ |

Figure 5:
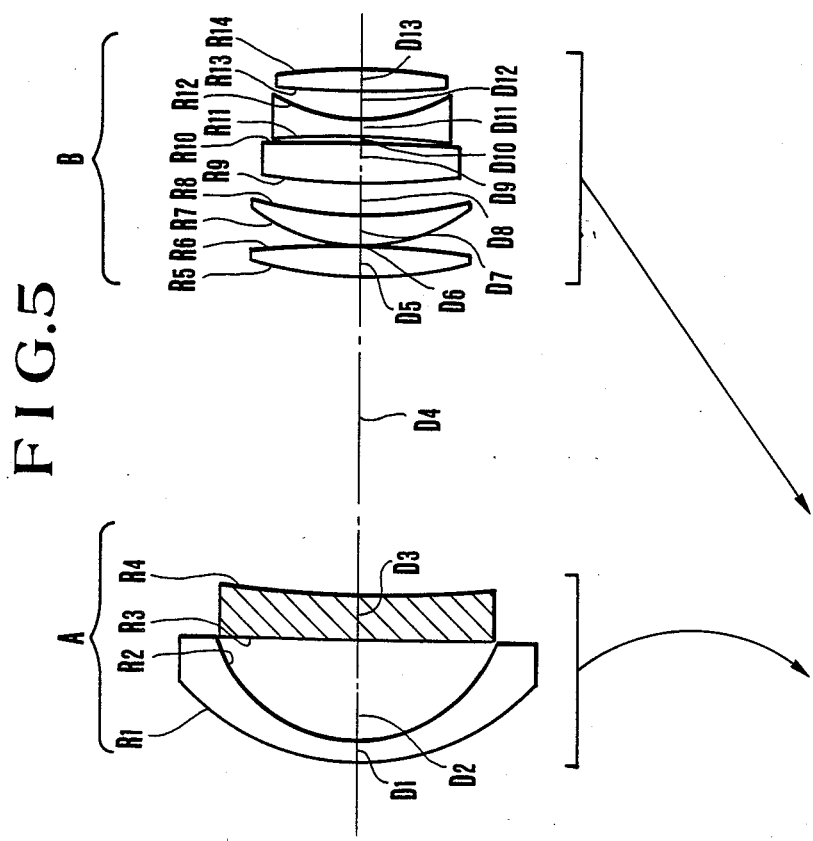
Figure 6:
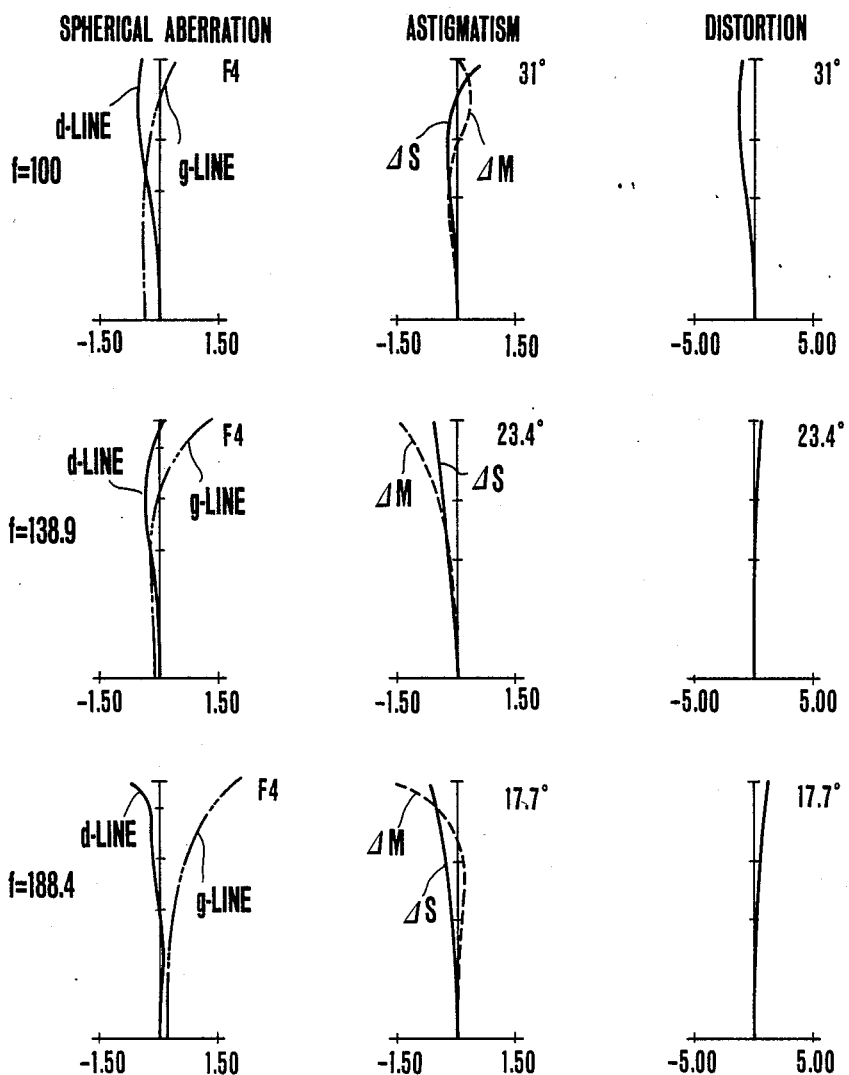

FIG. 5 illustrates a third specific example of the objective whose spherical aberrations for the spectral g- and d-lines, astigmatisms in the sagittal and meridonal planes S and M and distortion in the focal length positions of f=100 mm, 138.9 mm and 188.4 mm are shown in FIG. 6. The objective can be constructed in accordance with the numerical data given in Tables 3-1 to 3-3 for the radii of curvature, R, the axial thicknesses or air separations, D, and the refractive indices N and Abbe numbers V of the various lens elements. The subscripts are subscripts numbered consecutively from front to rear, and the plus and minus values of R indicate convex and concave surfaces relative to the front respectively. The refractive index distribution in the i-th lens counting from the front which is of the radial type can be expressed by the equation (1).

The objective of FIG. 5 comprises, from front to rear, a negative first lens unit A and a positive second lens unit B. Both lens units are axially moved with the air separation therebetween being decreased as the focal length of the entire system is varied from the shortest to the longest value. The front unit A consists of, from front to rear, a negative meniscus lens of forward convexity defined by surfaces R1 and R2 and a positive radial gradient type lens defined by surfaces R3 and R4. The rear unit B has its constituent lenses all made of homogeneous media.

The refractive index distribution type lens R3, R4 has such a pattern that the refractive index varies at a small rate in the paraxial region and drops steeply in the marginal zone. As the coefficient $N_2$ of the equation N(h) is $N_2 < 0$, it is able to correct barrel type distortion in the wide angle positions to a minimum.

Also in the telephoto positions, the spherical aberration produced from the second surface R2 of the frontmost or negative meniscus lens of the front unit A, as is largely over-corrected, is corrected to the opposite direction, when rays of light pass through the interior of the refractive index distribution type lens. Further, the coma in the telephoto positions is affected toward over-correction when the rays of light pass through the interior of that lens.

For this reason, the negative first lens unit which was heretofore constructed with three or four lenses can be constructed with only two lenses. A good stability of correction of the various aberration throughout the entire range is still achieved.

The use of the refractive index distribution type lens in the objective gives additional advantages which are explained below.

Because the negative first lens unit A, which is bulky and heavy as a rule, can be constructed with a greatly reduced number of constituent lenses, a great reduction in the weight and a great advance in compactness have been achieved. Moreover, this is accompanied with a possibility of shortening the total length of the entire system. Also, the effective diameter of the front unit necessary to the off-axis light pencil can be minimized. Further, concerning the aberration correction, barrel type distortion in the wide angle positions and spherical aberration and coma in the telephoto positions can be held to a minimum.

TABLE 3-1 f = 100–188.4 mm FNO = 4 2ω = 62°–35.4°

| Radius of Curvature | Axial Thickness or Air Separation | Refractive Index | Abbe Number |
|---|---|---|---|
| R1 = 74.159 | D1 = 5.28 | N1 = 1.65160 | ν1 = 58.6 |
| R2 = 43.253 | D2 = 36.49 | | |
| R3 = 828.363 | D3 = 17.14 | N2 = N2 (h) | |
| R4 = 297.760 | D4 = variable | | |
| R5 = 145.269 | D5 = 8.00 | N3 = 1.62230 | ν3 = 53.2 |
| R6 = −420.377 | D6 = 0.28 | | |
| R7 = 53.378 | D7 = 8.08 | N4 = 1.60311 | ν4 = 60.7 |
| R8 = 136.821 | D8 = 7.64 | | |
| R9 = 177.608 | D9 = 11.44 | N5 = 1.60311 | ν5 = 60.7 |
| R10 = 644.746 | D10 = 2.09 | | |
| R11 = −262.999 | D11 = 5.31 | N6 = 1.80518 | ν6 = 25.4 |
| R12 = 52.185 | D12 = 6.96 | | |
| R13 = 186.667 | D13 = 7.75 | N7 = 1.67270 | ν7 = 32.1 |
| R14 = −104.910 | | | |

TABLE 3-2

| Di | f | | |
|---|---|---|---|
| | 100.0 | 138.9 | 188.4 |
| D4 | 90.4271 | 41.1932 | 7.9396 |

TABLE 3-3

| Ni ( ) | λ | $N_0$ | $N_1$ | $N_2$ |
|---|---|---|---|---|
| N2 (h) | d | 1.64769 | $-3.379851 \times 10^{-5}$ | $-1.772131 \times 10^{-8}$ |
| | g | 1.67252 | $-3.731571 \times 10^{-5}$ | $-1.576371 \times 10^{-8}$ |

| | | $N_3$ | $N_4$ | $N_5$ |
|---|---|---|---|---|
| | | $-7.347091 \times 10^{-12}$ | $3.960301 \times 10^{-15}$ | $-3.032661 \times 10^{-18}$ |
| | | $-1.051681 \times 10^{-11}$ | $5.477601 \times 10^{-15}$ | $-3.078831 \times 10^{-18}$ |

Figure 7:
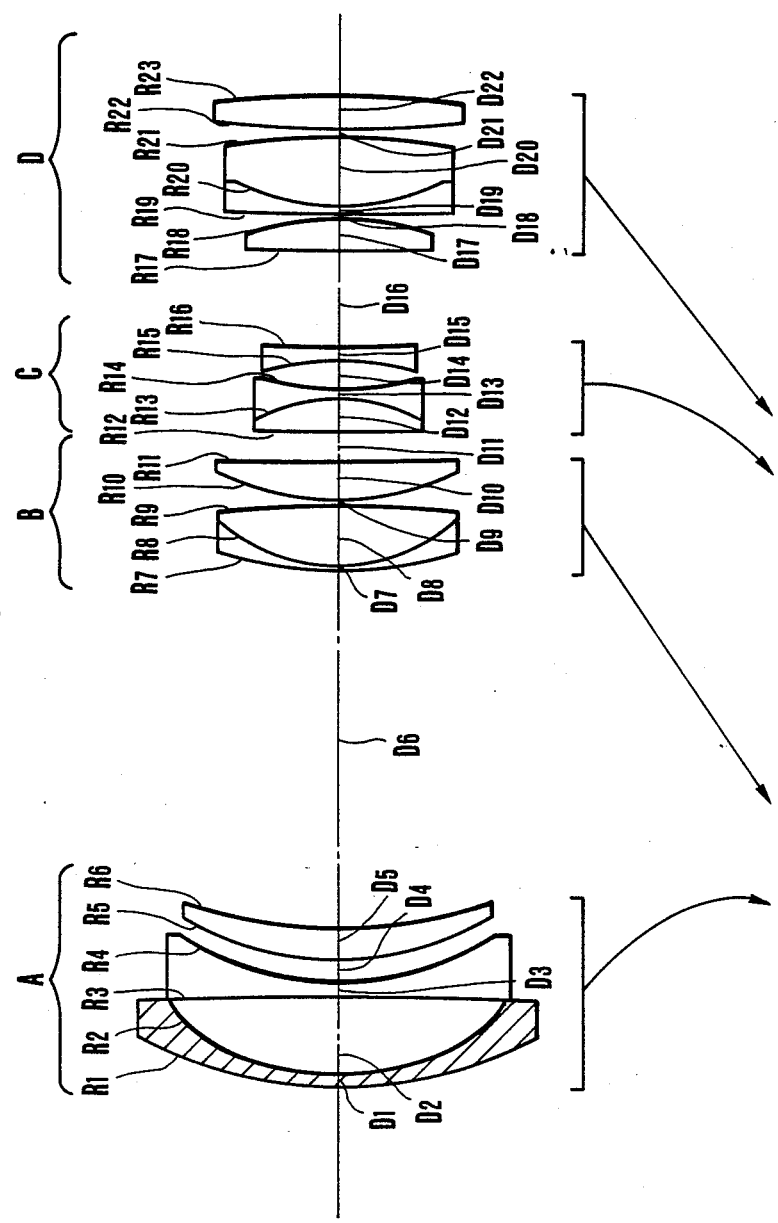
Figure 8:
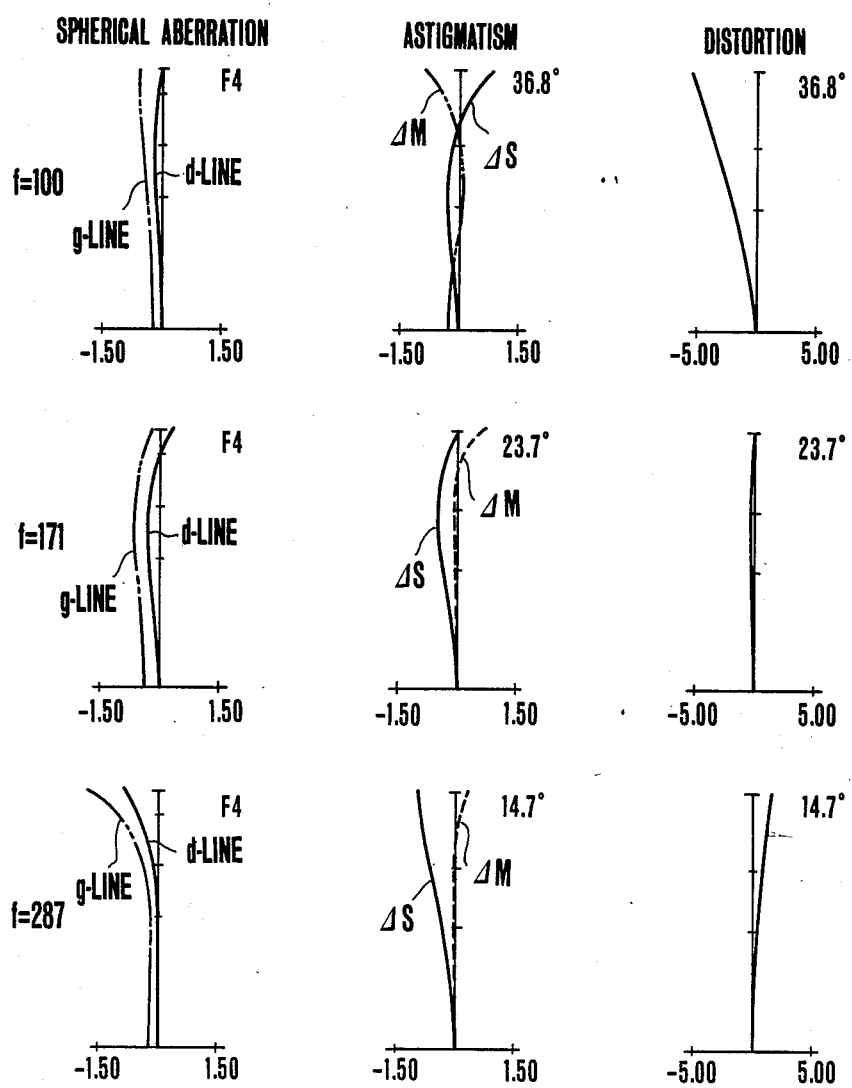

FIG. 7 illustrates a fourth specific example of the objective according to the invention whose aberrations in the focal length positions of f=100 mm, 171 mm and 287 mm are shown in FIG. 8. This objective can be constructed in accordance with the numerical data given in Tables 4–1 to 4–3, where the refractive index distribution is expressed by the equation (1).

The objective of FIG. 7 comprises, from front to rear, a negative first lens unit A, a positive second lens unit B, a negative third lens unit C and a positive fourth lens unit D. All of the lens units are axially moved with the air separations between the units A and B and between the units C and D being decreased, and the air separation between the units B and C being increased, as the focal length of the entire system is increased from the shortest to the longest value. The negative first lens unit A is provided with a positive radial gradient type meniscus lens defined by surfaces R1 and R2 at the frontmost position.

With the first lens unit of negative power, when the angular field is so widened as in the objective of the invention, the negative first lens unit produces large barrel type distortion in the wide angle positions. This has constituted an obstacle to aberration correction. In the objective of the invention, however, as the frontmost or negative meniscus lens of the negative first lens unit A, use is made of a positive radial gradient type lens having such a pattern that the refractive index in the marginal zone is smaller than that in the paraxial region. Accordingly, barrel type distortion produced from the first lens unit A in the wide angle positions is reduced.

Meanwhile, the second surface R2 of the negative meniscus lens of the negative first lens unit A usually produces large over-corrected spherical aberration. The impartment of such a refractive index pattern thereto reduces the tendency of the spherical aberration to be over-corrected, since the refractive index on the concave rear surface R2 of the negative meniscus lens becomes progressively smaller as the height from the optical axis increases.

The impartment of such a refractive index distribution also causes the rays of light in passing through the interior of the negative meniscus lens to produce spherical aberration and coma in the opposite direction to that in which they are produced from the second surface of the negative meniscus lens. Alternatively, it produces under-corrected spherical aberration and coma, thus producing an aberration correcting effect.

Therefore, it is possible to achieve an objective corrected for good stability of the various aberrations throughout the entire range of variation of the focal length.

The use of the refractive index distribution type lens in the objective provides additional advantages. The number of constituent lenses for the negative first lens unit of the objective of the type described above, which was heretofore usually four or more, is reduced to as few as three. This leads to a reduction of the weight and a decrease of the overall thickness of the negative first lens unit. Therefore, it is possible to shorten the total length of the entire system.

Also, barrel type distortion in the wide angle positions is held to a minimum, and the spherical aberration and coma in the telephoto positions can be properly corrected.

The above-described improved results can be attained particularly when the condition that $N_2 < 0$ where $N_2$ is the coefficient in the equation for the refractive index distribution N(h) is satisfied.

TABLE 4-1 f = 100–287 mm F.NO. = 4.0 2ω = 73.6°–29.3°

| Radius of Curvature | Axial Thickness or Air Separation | Refractive Index | Abbe Number |
|---|---|---|---|
| R1 = 177.986 | D1 = 4.71 | N1 = N1 (h) | |
| R2 = 99.569 | D2 = 30.58 | | |
| R3 = −1404.275 | D3 = 5.16 | N2 = 1.71300 | ν2 = 53.8 |
| R4 = 117.710 | D4 = 9.34 | | |
| R5 = 122.243 | D5 = 12.28 | N3 = 1.80518 | ν3 = 25.4 |
| R6 = 195.281 | D6 = variable | | |
| R7 = 154.012 | D7 = 3.53 | N4 = 1.80518 | ν4 = 25.4 |
| R8 = 79.887 | D8 = 22.54 | N5 = 1.62299 | ν5 = 58.2 |
| R9 = −309.070 | D9 = 1.60 | | |
| R10 = 117.912 | D10 = 13.58 | N6 = 1.62299 | ν6 = 58.2 |
| R11 = 1976.958 | D11 = variable | | |
| R12 = 493.901 | D12 = 13.83 | N7 = 1.74077 | ν7 = 27.8 |
| R13 = −67.733 | D13 = 3.47 | N8 = 1.77250 | ν8 = 49.6 |
| R14 = 130.479 | D14 = 10.44 | | |
| R15 = −115.002 | D15 = 4.09 | N9 = 1.62299 | ν9 = 58.2 |
| R16 = 482.241 | D16 = variable | | |
| R17 = −3571.624 | D17 = 11.95 | N10 = 1.71300 | ν10 = 53.8 |
| R18 = −129.192 | D18 = 1.84 | | |
| R19 = −2335.447 | D19 = 3.25 | N11 = 1.80518 | ν11 = 25.4 |
| R20 = 104.135 | D20 = 25.87 | N12 = 1.51633 | ν12 = 64.1 |
| R21 = −267.983 | D21 = 1.64 | | |
| R22 = 268.367 | D22 = 14.26 | N13 = 1.62299 | ν13 = 58.2 |
| R23 = −399.312 | | | |

TABLE 4-2

| Di | f | | |
|---|---|---|---|
| | 100 | 171 | 287 |
| D6 | 139.78 | 54.43 | 10.50 |
| D11 | 10.89 | 32.06 | 58.73 |
| D16 | 37.27 | 21.94 | 2.50 |

TABLE 4-3

| $N_i()$ | $\lambda$ | $N_0$ | $N_1$ | $N_2$ |
|---|---|---|---|---|
| $N_i$ (h) | d | 1.60311 | $-4.27443 \times 10^{-6}$ | $-1.46649 \times 10^{-9}$ |
| | g | 1.61539 | $-2.78146 \times 10^{-6}$ | $-1.86272 \times 10^{-9}$ |

| | | $N_3$ | $N_4$ |
|---|---|---|---|
| | | $1.94216 \times 10^{-13}$ | $-1.74743 \times 10^{-17}$ |
| | | $2.20268 \times 10^{-13}$ | $-1.64317 \times 10^{-17}$ |

Figure 9:
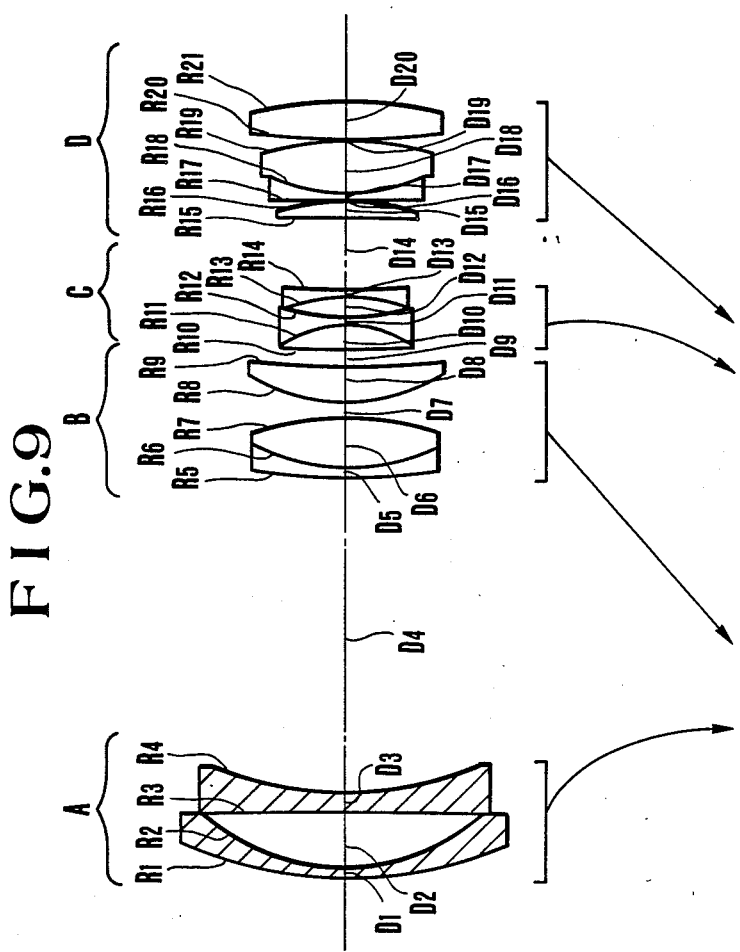
Figure 10:
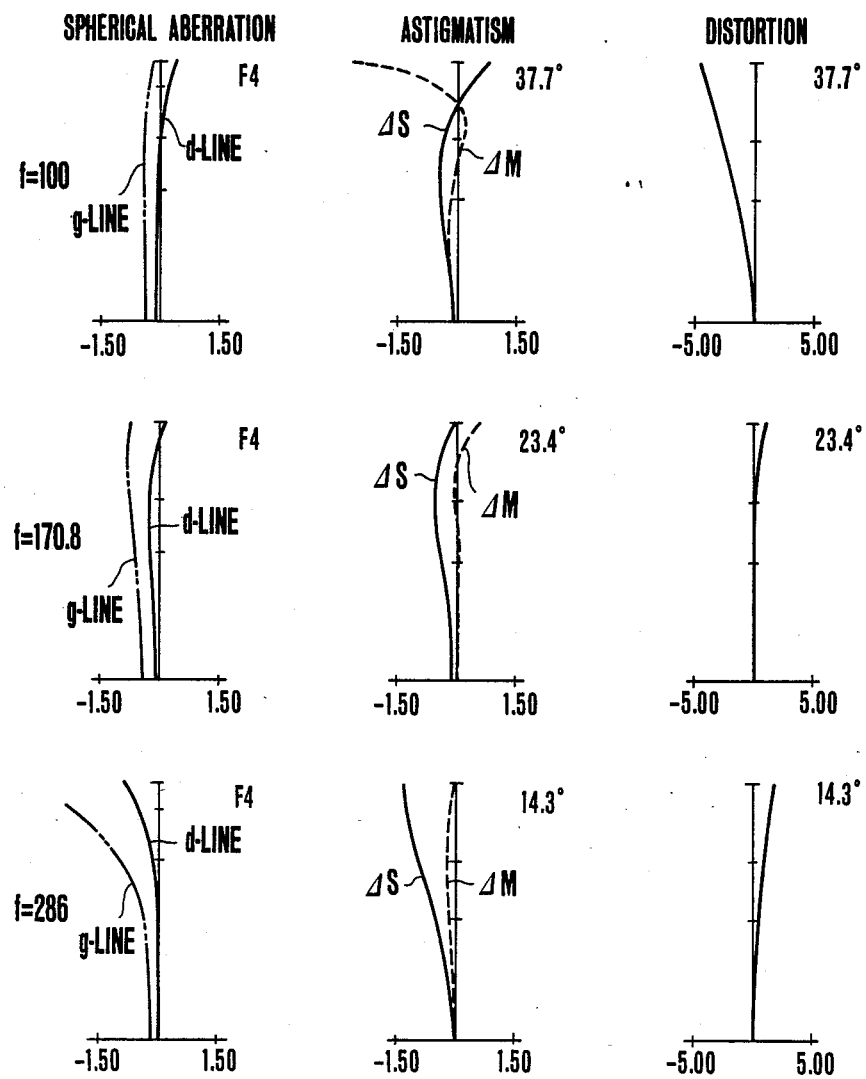

FIG. 9 illustrates a fifth specific example of the objective of variable focal length according to the invention whose aberrations in the focal length positions of f=100 mm, 170.8 mm and 286 mm are shown in FIG. 10. This objective can be constructed in accordance with the numerical data given in Tables 5-1 to 5-3 where the refractive index distribution of the axial type lens is expressed by the equation (2).

The objective of FIG. 9 comprises, from front to rear, a negative first lens unit A, a positive second lens unit B, a negative third lens unit C and a positive fourth lens unit D. All of the lens units are axially moved with the air separations between the units A and B and between the units C and D being decreased, and the air separation between the units B and C being increased, as the focal length of the entire system is increased from the shortest to the longest value. The negative first lens unit A is provided with a positive radial gradient type lens defined by surfaces R1 and R2 at the frontmost position and an axial type lens having increasing refractive indices from the front surface R3 to the rear surface R4 and positioned on the image side of the radial type lens.

In the known wide angle objective having a configuration similar to that of the objective of the invention in that the first lens unit is of negative power, much barrel type distortion is produced in the wide angle positions. Thus, the negative first lens unit has been considered as an obstacle to improve aberration correction. According to the present invention, the frontmost or negative meniscus lens in the negative first lens unit A is imparted with such a refractive index distribution that the refractive index in the marginal zone is smaller than that in the paraxial zone. The frontmost lens use has a positive radial gradient type lens so that the barrel type distortion, produced from the negative first lens unit A in the wide angle positions, is minimized.

Meanwhile, the second surface R2 of the frontmost or negative meniscus lens in the first lens unit A produces spherical aberration in a direction to be largely over-corrected. The co-existance of the above-stated refractive index distribution reduces the tendency of spherical aberration to be over-corrected, because the refractive index in the concave surface R2 of the negative meniscus lens decreases with increases in the height from the optical axis.

The impartment of such a refractive index distribution to the negative meniscus lens also causes the rays of light passing in the interior thereof to produce spherical aberration and coma in the opposite direction to that in which the second surface R2 of the negative meniscus lens produces them, or under-corrected ones, thus producing a correcting effect. It should be recognized that the above-described improvement in aberration correction are attained particularly when the condition of $N_2<0$ is satisfied where $N_2$ is the coefficient of the equation (1) for the refractive index distribution N(h).

The other or rearmost lens, defined by surfaces R3 and R4 in the negative first lens unit A, has such a refractive index distribution that the refractive index becomes progressively higher as the distance from the front surface to the rear surface increases. This affects the spherical aberration which has been too under-corrected by the frontmost or negative meniscus lens toward the direction of being over-corrected.

Therefore, it is possible to achieve an objective of variable focal length corrected for good stability of aberrations over the extended range of variation of the focal length.

TABLE 5-1 f = 100-286 mm FNO = 4 2ω = 75.4°-28.6°

| Radius of Curvature | Axial Thickness or Air Separation | Refractive Index | Abbe Number |
|---|---|---|---|
| R1 = 208.122 | D1 = 6.65 | N1 = N1 (h) | |
| R2 = 119.274 | D2 = 26.55 | | |
| R3 = −1601.647 | D3 = 9.04 | N2 = N2 (x) | |
| R4 = 193.189 | D4 = variable | | |
| R5 = 238.052 | D5 = 4.24 | N3 = 1.80518 | ν3 = 25.4 |
| R6 = 111.949 | D6 = 22.27 | N4 = 1.62299 | ν4 = 58.2 |
| R7 = −207.988 | D7 = 10.15 | | |
| R8 = 94.430 | D8 = 15.50 | N5 = 1.62299 | ν5 = 58.2 |
| R9 = 440.545 | D9 = variable | | |
| R10 = 520.349 | D10 = 11.96 | N6 = 1.74077 | ν6 = 27.8 |
| R11 = −72.653 | D11 = 3.44 | N7 = 1.77250 | ν7 = 49.6 |
| R12 = 127.096 | D12 = 9.59 | | |
| R13 = −100.777 | D13 = 3.13 | N8 = 1.62299 | ν8 = 58.2 |
| R14 = 1811.221 | D14 = variable | | |
| R15 = −606.224 | D15 = 6.30 | N9 = 1.71300 | ν9 = 53.8 |
| R16 = −134.670 | D16 = 1.31 | | |
| R17 = −2417.433 | D17 = 3.10 | N10 = 1.80518 | ν10 = 25.4 |
| R18 = 103.456 | D18 = 23.56 | N11 = 1.51633 | ν11 = 64.1 |
| R19 = −199.361 | D19 = 1.61 | | |
| R20 = 419.198 | D20 = 17.53 | N12 = 1.60300 | ν12 = 65.5 |
| R21 = −206.990 | | | |

TABLE 5-2

| Di | f | | |
|---|---|---|---|
| | 100 | 170 | 286 |
| D4 | 151.97 | 66.61 | 22.68 |
| D9 | 8.9 | 30.05 | 56.72 |
| D14 | 36.9 | 21.59 | 2.15 |

TABLE 5-3

| $N_i()$ | $\lambda$ | $N_0$ | $N_1$ | $N_2$ |
|---|---|---|---|---|
| N1 (h) | d | 1.60311 | $3.21212 \times 10^{-6}$ | $-3.17685 \times 10^{-9}$ |
| | g | 1.61539 | $1.20257 \times 10^{-6}$ | $-2.07249 \times 10^{-9}$ |
| N2 (x) | d | 1.76200 | $8.48492 \times 10^{-5}$ | $1.98427 \times 10^{-7}$ |
| | g | 1.78633 | $-1.18722 \times 10^{-3}$ | $-1.10890 \times 10^{-6}$ |

| | | $N_3$ | $N_4$ |
|---|---|---|---|
| | | $3.91890 \times 10^{-13}$ | $-2.59985 \times 10^{-17}$ |
| | | $8.60312 \times 10^{-14}$ | $2.56331 \times 10^{-18}$ |
| | | $5.47972 \times 10^{-10}$ | $4.88103 \times 10^{-12}$ |
| | | $-6.26883 \times 10^{-9}$ | $8.38526 \times 10^{-12}$ |

Figure 11:
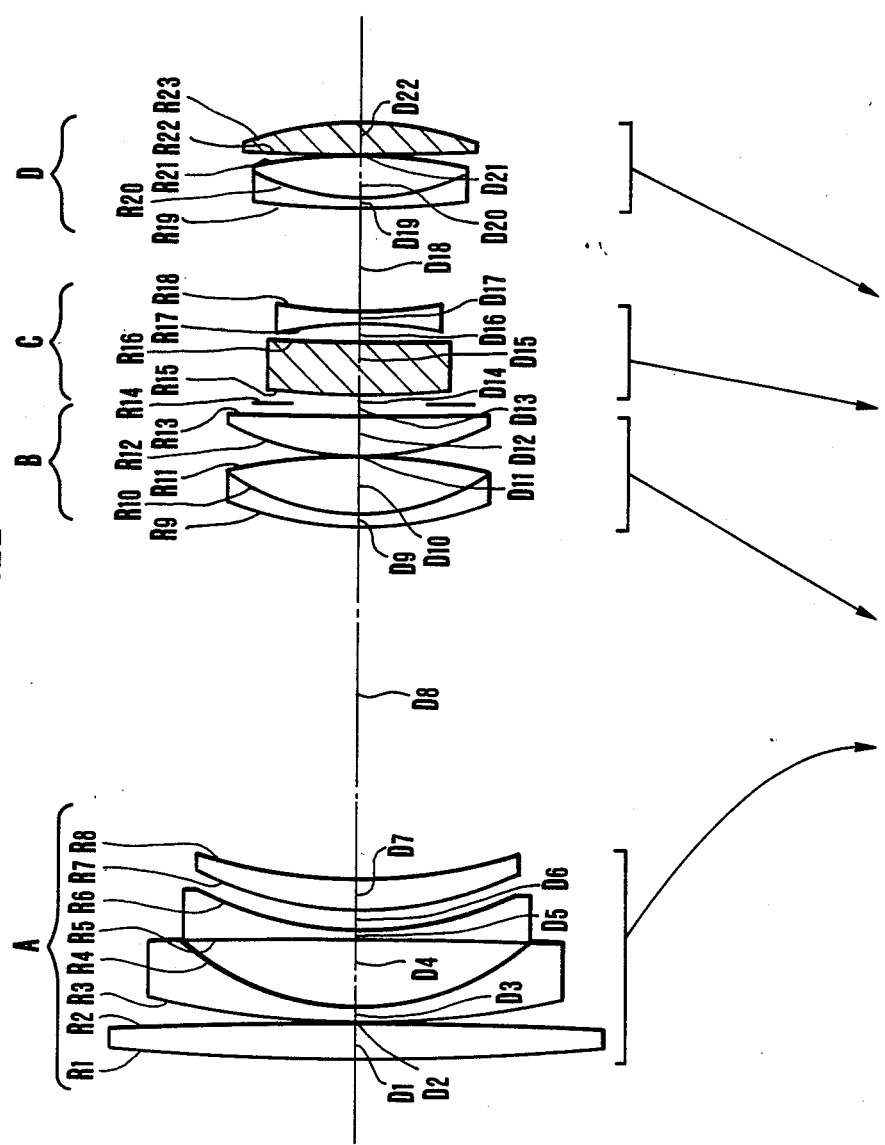
Figure 12:
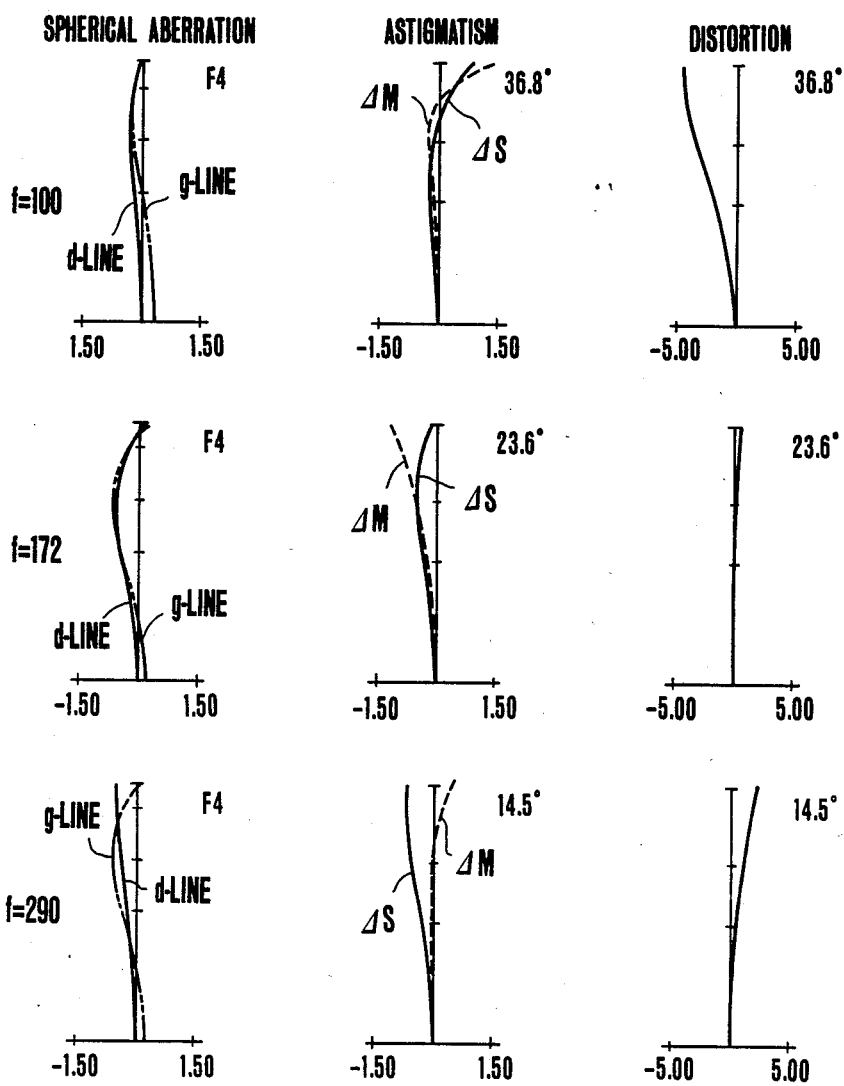

FIGS. 11 and 12 illustrate a sixth example of the objective of the invention comprising, from front to rear, a negative first lens unit A, a positive second lens unit B, a negative third lens unit C, and a positive fourth lens unit D. The first to fourth lens units A to D are moved axially with the air separations between the units A and B and between the units C and D being decreased. The air separation between the units B and C being increased as the focal length is increased from the shortest to the longest valve. As a result, the third and fourth lens units C and D each are included with a refractive index distribution type lens.

TABLE 6-1

(FIGS. 11 and 12)
F = 100–290 FNO. = 1:4.0 2ω = 73.7°–29°

| | | | |
|---|---|---|---|
| R1 = 1189.52 | D1 = 14.55 | N1 = 1.51112 | ν1 = 60.5 |
| R2 = −1836.55 | D2 = 0.69 | | |
| R3 = 371.24 | D3 = 5.54 | N2 = 1.71300 | ν2 = 53.8 |
| R4 = 98.64 | D4 = 25.98 | | |
| R5 = 30639.98 | D5 = 4.50 | N3 = 1.71300 | ν3 = 53.8 |
| R6 = 151.14 | D6 = 6.93 | | |
| R7 = 129.17 | D7 = 12.82 | N4 = 1.80518 | ν4 = 25.4 |
| R8 = 217.96 | D8 = variable | | |
| R9 = 155.05 | D9 = 4.16 | N5 = 1.80518 | ν5 = 25.4 |
| R10 = 81.38 | D10 = 22.51 | N6 = 1.62299 | ν6 = 58.2 |
| R11 = −296.65 | D11 = 0.69 | | |
| R12 = 120.67 | D12 = 13.85 | N7 = 1.62299 | ν7 = 58.2 |
| R13 = 2012.36 | D13 = variable | | |
| R14 = diaphragm | D14 = 3.46 | | |
| R15 = ∞ | D15 = 16.03 | N8 (h) | |
| R16 = ∞ | D16 = 10.26 | | |
| R17 = −102.15 | D17 = 3.46 | N9 = 1.61800 | ν9 = 63.4 |
| R18 = 143.62 | D18 = variable | | |
| R19 = 417.39 | D19 = 4.16 | N10 = 1.80518 | ν10 = 25.4 |
| R20 = 92.33 | D20 = 15.59 | N11 = 1.51633 | ν11 = 64.1 |
| R21 = −207.27 | D21 = 0.69 | | |
| R22 = 767.88 | D22 = 12.12 | N12 (x) | |
| R23 = −135.71 | | | |

TABLE 6-2

| f | 100 | 172 | 290 |
|---|---|---|---|
| D8 | 137.43 | 52.11 | 8.27 |
| D13 | 5.36 | 27.15 | 53.84 |
| D18 | 40.61 | 25.28 | 5.81 |

TABLE 6-3

$N8 (h) = N_0 + N_1 h^2 + N_2 h^4 + N_3 h^6$
$N12 (x) = N_0 + N_1 x + N_2 x^2$

| | | $N_0$ | $N_1$ | $N_2$ |
|---|---|---|---|---|
| N8 (h) | d | 1.62 | $3.64450 \times 10^{-5}$ | $-7.43660 \times 10^{-9}$ |
| | g | 1.64209 | $3.25036 \times 10^{-5}$ | $-9.37109 \times 10^{-9}$ |

| | $N_3$ |
|---|---|
| | $3.68304 \times 10^{-13}$ |
| | $6.67792 \times 10^{-13}$ |

| | | $N_0$ | $N_1$ | $N_2$ |
|---|---|---|---|---|
| N12 (x) | d | 1.81554 | $-1.38490 \times 10^{-2}$ | $5.39781 \times 10^{-4}$ |
| | g | 1.83867 | $-1.54723 \times 10^{-2}$ | $6.18003 \times 10^{-4}$ |

The advantages of the invention may be summarized as follows:

The number of constituent lenses for each of the lens units can be significantly reduced, enabling a great reduction of the weight and size to be achieved. The reduction of the number of constituent lenses of the positive second lens unit results in a reduction in its overall thickness. This leads to either or both of an increase of the total zooming movement of itself or any of the adjacent units and a reduction of the air separations between the second lens unit and any of the adjacent lens units. Therefore, it is very easy to achieve either or both of a great increase in the range of variation of the focal length and a great reduction of the total length of the entire system.

The use of at least one refractive index distribution type lens in either of the first and second lens units enables the interval between the principal points of the first and second lens units to be reduced. This leads to a decrease in the diameter of the first lens unit that admits of the off-axis light pencil. Therefore, the diameter of the outer lens barrel can be reduced. So, filters of smaller diameter become usable with the objective of the invention.

As for the aberrational problems, because each lens unit can be better corrected in itself than was heretofore possible, all the aberrations of the objective can be maintained more stable throughout the entire range of variation of the focal length. Because there is no necessity of using a compound-eye optical system, good image quality is preserved.

The reduction of the Petzval sum allows for an increase in the power of the positive second lens group. So, it becomes possible to shorten the physical length. Because the reduced Petzval sum is corrected by smaller surface curvatures or a gentler power arrangement than was heretofore required, the higher order aberrations can be reduced.

Ghosts which are very difficult to remove in the conventional objective can be significantly minimized due to the great reduction of the total number of lenses of the objective. From the same reason, as the light loss due to the surface reflection and internal absorption is reduced, the T-number can be made faster than was heretofore possible. The rapid reduction of the total number of lens surfaces implies that the cost of the multi-layer anti-reflection coatings is largely reduced. (The transmittance of the ordinary zoom lenses is not more than 90%, and, in the case of larger numbers of constituent lenses, it sometimes falls below 80%).

The assembling and adjusting operations are facilitated when the number of constituent lenses in each lens unit is reduced. In the past, it was impossible to build the zoom lens in ultra-small sized optical instruments such as sub-miniature cameras and gastrocameras, although there were urgent demands for it, since the total number of lenses of the complete zoom lens was very large, and the individual elements are very small in size. The use of the refractive index distribution type lens enables each lens unit to be constructed with only one or two lenses. So, the machining and assembling operations become far easier. Therely, it will be possible to install the zoom lens in the ultra-small sized optical instrument.

As has been described above, according to the present invention as applied to the two-unit objective of variable focal length whose first and second units are of negative and positive powers respectively, use is made of a refractive index distribution type lens made of a homogeneous medium in at least one of the two lens units. A great advance in the imaging performance, the reduction of the weight, the compactness, and further the zoom ratio have been achieved. This makes it possible to significantly reduce the complexity of structure of the operating mechanism for such a type of objective.

What is claimed is:

1. An objective of variable focal length comprising a plurality of lens units, of which the first lens unit, counting from an object side, has a negative refractive power and a second unit has a positive refractive power, at least said first and said second lens units being moved axially with their air separation being varied to vary the focal length of the entire system, whereby at least one of said lens units includes at least one refractive index distribution type lens varying in refractive index that is arranged on a common optical axis with said plurality of lens units, wherein said refractive index distribution type lens comprises a distribution of refractive indexes so that a change in aberrations due to a variation of the objective focal length is restricted.

2. An objective according to claim 1, wherein said refractive index distribution type lens is positioned in said first lens unit.

3. An objective according to claim 2, wherein said refractive index distribution type lens in said first lens unit has such a refractive index distribution that the refractive index becomes progressively lower as the height from the optical axis increases.

4. An objective according to claim 3, satisfying the following condition that, as the refractive index distribution in said refractive index distribution type lens is expressed by $N(h)=N_0+N_1h^2+N_2h^4+N_3h^6\ldots$ where h is the height from the optical axis, $N_0$ is the refractive index on the optical axis, and $N_1, N_2, N_3, \ldots$ are the coefficients, $N_1<0$.

5. An objective according to claim 4, which satisfies the condition $N_2<0$.

6. An objective according to claim 5, wherein said refractive index distribution type lens is a negative lens having a concave surface on the image side.

7. An objective according to claim 6, wherein said negative lens is of a meniscus shape.

8. An objective according to claim 2, wherein said refractive index distribution type lens in said first lens unit has such a refractive index distribution that the refractive index becomes progressively higher as the axial distance from the front surface thereof increases.

9. An objective according to claim 1, wherein said refractive index distribution type lens is positioned in said second lens unit.

10. An objective according to claim 9, wherein said second lens unit includes a frontmost portion with a refractive index distribution type lens having a front convex surface in which the refractive index becomes progressively lower as the height from the optical axis increases.

11. An objective according to claim 10, wherein said refractive index distribution type lens has a refractive index that is variable in the optical axis direction.

12. An objective according to claim 10, satisfying the condition that as the refractive index distribution in said refractive index distribution type lens is expressed by $N(h)=N_0+N_1h^2+N_2h^4+N_3h^6+\ldots$ where h is the height from the optical axis, $N_0$ is the refractive index in the paraxial region, and $N_1, N_2, N_3, \ldots$ are the coefficients, $N_1<0$ and $N_2<0$.

13. An objective according to claim 9, wherein said second lens unit includes a rearmost portion with a refractive index distribution type lens in which the refractive index becomes progressively higher as the height from the optical axis increases.

14. An objective according to claim 13, satisfying the condition that as the refractive index distribution in said refractive index distribution type lens is expressed by $N(h)=N_0+N_1h^2+N_2h^4+N_3h^6+\ldots$ where h is the height from the optical axis, $N_0$ is the refractive index in the paraxial region, and $N_1, N_2, N_3, \ldots$ are the coefficients, and $N_1>0$.

15. An objective according to claim 14, which satisfies the condition $N_2>0$.

16. An objective according to claim 15, wherein said refractive index distribution type lens has a negative power.

17. An objective according to claim 1, further comprising a third lens unit which comprises another refractive index distribution type lens and has a negative refractive power.

18. An objective according to claim 1, further comprising a third lens unit which has a negative refractive power and a fourth lens unit which comprises another refractive index distribution type lens and has a positive refractive power.

* * * * *

UNITED STATES PATENT AND TRADEMARK OFFICE
CERTIFICATE OF CORRECTION

PATENT NO. : 4,907,866          Page 1 of 3
DATED      : March 13, 1990
INVENTOR(S): NOZOMU KITAGISHI, ET AL.

It is certified that error appears in the above-identified patent and that said Letters Patent is hereby corrected as shown below:

Column 1
    Line 17, "the" should read --a--.
    Line 19, before "entire", insert --the--.
    Line 24, "have" should read --has--.
    Line 32, "objectives, so" should read --objectives. So--.

Column 2
    Line 1, "over all" should read --overall--.
    Line 23, "increase" should read --an increase--.
    Line 42, Q: "Taking an example of the" should read --consider for example a--.

Column 3:
    Line 45, "possible" should be deleted.
    Line 51, "lens." should read --lenses.--
    Line 63, "of the" should read --constituting the present--.
    Line 66, "constituting" should read --of--.
    Line 67, "present" should be deleted.

Column 4
    Line 25, "F$\neq$ number," should read --F number,--.

UNITED STATES PATENT AND TRADEMARK OFFICE
CERTIFICATE OF CORRECTION

PATENT NO. : 4,907,866

DATED : March 13, 1990

INVENTOR(S) : NOZOMU KITAGISHI, ET AL.

It is certified that error appears in the above-identified patent and that said Letters Patent is hereby corrected as shown below:

Column 5

Line 29, "$N_1 < 0$" should read --$N_1 > 0$--.

Column 7

Line 14, "frontmost" should read --front--.

Column 8

Line 50, "aberration" should read --aberrations--.

Column 11

Line 43, "use" should read --used--.

Line 63, "improvement" should read --improvements--.

UNITED STATES PATENT AND TRADEMARK OFFICE
CERTIFICATE OF CORRECTION

PATENT NO. : 4,907,866

DATED : March 13, 1990

INVENTOR(S) : NOZOMU KITAGISHI, ET AL

Page 3 of 3

It is certified that error appears in the above-identified patent and that said Letters Patent is hereby corrected as shown below:

<u>Column 12</u>

Line 65, "being" should read --is--.

Line 66, "valve." should read --value--.

<u>Column 14</u>

Line 20, "From" should read --For--.

Line 40, "Therely," should read --Thereby,--.

Signed and Sealed this

Third Day of November, 1992

Attest:

DOUGLAS B. COMER

Attesting Officer     Acting Commissioner of Patents and Trademarks